United States Patent
Griffin

(10) Patent No.: US 12,548,328 B2
(45) Date of Patent: Feb. 10, 2026

(54) RELATIONSHIP MODELING AND EVALUATION BASED ON VIDEO DATA

(71) Applicant: Insight Direct USA, Inc., Tempe, AZ (US)

(72) Inventor: Michael Griffin, Wayland, MA (US)

(73) Assignee: Insight Direct USA, Inc., Chandler, AZ (US)

( * ) Notice: Subject to any disclaimer, the term of this patent is extended or adjusted under 35 U.S.C. 154(b) by 572 days.

(21) Appl. No.: 17/951,992

(22) Filed: Sep. 23, 2022

(65) Prior Publication Data

US 2023/0177834 A1  Jun. 8, 2023

Related U.S. Application Data

(60) Provisional application No. 63/405,719, filed on Sep. 12, 2022, provisional application No. 63/405,722, (Continued)

(51) Int. Cl.
*G06V 20/40* (2022.01)
*G06F 18/22* (2023.01)
*G06F 40/30* (2020.01)
*G06V 10/426* (2022.01)
*G06V 10/44* (2022.01)
(Continued)

(52) U.S. Cl.
CPC ............ *G06V 20/41* (2022.01); *G06F 18/22* (2023.01); *G06F 40/30* (2020.01); *G06V 10/426* (2022.01); *G06V 10/44* (2022.01); *G06V 10/70* (2022.01); *G06V 10/761* (2022.01); *G06V 10/774* (2022.01); *G06V 10/7753* (2022.01); *G06V 10/86* (2022.01); *G06V 20/46* (2022.01);
(Continued)

(58) Field of Classification Search
CPC ...... G06V 20/41; G06V 10/426; G06V 10/44; G06V 10/70; G06V 10/761; G06V 10/774; G06V 10/7753; G06V 10/86; G06V 20/46; G06V 20/70; G06V 30/274; G06V 40/20; G06F 18/22; G06F 40/30
See application file for complete search history.

(56) References Cited

U.S. PATENT DOCUMENTS 8,533,134 B1   9/2013   Zhao et al.
9,710,544 B1   7/2017   Smith et al.
(Continued)

*Primary Examiner* — Ayodeji O Ayotunde
(74) *Attorney, Agent, or Firm* — Kinney & Lange, P.A.

(57) ABSTRACT

A method includes acquiring digital video data that portrays an interacting event, identifying a plurality of video features in the digital video data, analyzing the plurality of video features to create a relationship graph, determining a relationship score based on the relationship graph using a first computer-implemented machine learning model, and outputting the relationship score with a user interface. The interacting event comprises a plurality of interactions between a first individual and a second individual and each video feature of the plurality of video features corresponds to an interaction of the plurality of interactions. The relationship graph comprises a first node, a second node, and a first edge extending from the first node to the second node. The first node represents the first individual, the second node represents the second individual, and a weight of the first edge represents a relationship strength between the first individual and the second individual.

15 Claims, 10 Drawing Sheets

Related U.S. Application Data filed on Sep. 12, 2022, provisional application No. 63/405,716, filed on Sep. 12, 2022, provisional application No. 63/405,721, filed on Sep. 12, 2022, provisional application No. 63/286,844, filed on Dec. 7, 2021.

(51) Int. Cl.
*G06V 10/70* (2022.01)
*G06V 10/74* (2022.01)
*G06V 10/774* (2022.01)
*G06V 10/86* (2022.01)
*G06V 20/70* (2022.01)
*G06V 30/262* (2022.01)
*G06V 40/20* (2022.01)
*G10L 25/57* (2013.01)

(52) U.S. Cl.
CPC ............ *G06V 20/70* (2022.01); *G06V 30/274* (2022.01); *G06V 40/20* (2022.01); *G10L 25/57* (2013.01)

(56) References Cited

U.S. PATENT DOCUMENTS

| | | |
|---|---|---|
| 2016/0125346 A1 | 5/2016 | Krantz et al. |
| 2019/0066136 A1* | 2/2019 | Kopikare ........... G06Q 30/0282 |
| 2019/0251359 A1* | 8/2019 | Pranger ................ G06V 40/174 |
| 2020/0285700 A1* | 9/2020 | Narayanan ............... G06N 5/01 |
| 2020/0365188 A1* | 11/2020 | Brinkman, Jr. ...... H04N 21/472 |
| 2023/0186120 A1 | 6/2023 | Zhao et al. |
| 2024/0312252 A1 | 9/2024 | Qiu et al. |

\* cited by examiner

RELATIONSHIP MODELING AND EVALUATION BASED ON VIDEO DATA

CROSS-REFERENCE TO RELATED APPLICATION(S)

This application claims the benefit of U.S. Provisional Application No. 63/286,844 filed Dec. 7, 2021 for "MACHINE LEARNING METHOD TO QUANTIFY PRESENT STATE-OF-MIND AND PREDICT FUTURE STATE-OF-MIND OF ONE OR MORE INDIVIDUALS BASED ON VIDEO IMAGES OF THOSE INDIVIDUALS" by M. Griffin, H. Kotvis, K. Lumb, K. Poulson, and J. Miner, the disclosure of which is incorporated in its entirety by reference herein; of U.S. Provisional Application 63/405,716 filed Sep. 12, 2022 for "RELATIONSHIP MODELING AND EVALUATION BASED ON VIDEO DATA" by M. Griffin, the disclosure of which is incorporated in its entirety by reference herein; of U.S. Provisional Application 63/405,719 filed Sep. 12, 2022 for "RELATIONSHIP MODELING AND ANOMALY DETECTION BASED ON VIDEO DATA" by M. Griffin, the disclosure of which is incorporated in its entirety by reference herein; of U.S. Provisional Application 63/405,721 filed Sep. 12, 2022 for "RELATIONSHIP MODELING AND KEY FEATURE DETECTION BASED ON VIDEO DATA" by M. Griffin, the disclosure of which is incorporated in its entirety by reference herein; and of U.S. Provisional Application 63/405,722 filed Sep. 12, 2022 for "RELATIONSHIP MODELING AND ADJUSTMENT BASED ON VIDEO DATA" by M. Griffin, the disclosure of which is also incorporated in its entirety by reference herein.

BACKGROUND

The present disclosure relates to relationship evaluation and, more particularly, systems and methods for automatically evaluating relationships using video data.

Individuals interact with others in social and professional contexts and can form relationships through those interactions. It can be difficult to evaluate the strength of the relationship between two or more individuals by observing the interactions between those individuals. Further, it is difficult to evaluate relationships among individuals in real-time, especially for individuals having impairments that decrease the ability of those individuals to interpret verbal and/or non-verbal information.

SUMMARY

An embodiment of a method according to the present disclosure includes acquiring digital video data that portrays an interacting event, identifying a plurality of video features in the digital video data, analyzing the plurality of video features to create a relationship graph, determining a relationship score based on the relationship graph, and outputting the relationship score with a user interface. The interacting event comprises a plurality of interactions between a first individual and a second individual and each video feature of the plurality of video features corresponds to an interaction of the plurality of interactions. The relationship graph comprises a first node, a second node, and a first edge extending from the first node to the second node. The first node represents the first individual, the second node represents the second individual, and a weight of the first edge represents a relationship strength between the first individual and the second individual. The relationship score is determined using a first computer-implemented machine learning model.

An embodiment of a system according to the present disclosure includes a camera device for acquiring digital video data, a processor, a user interface, and a memory. The memory is encoded with instructions that, when executed, cause the processor to acquire digital video data from the camera, identify a plurality of features in the digital video data, analyze the plurality of features to create a relationship graph, determine a relationship score based on the relationship graph, and output the relationship score by the user interface. The digital video data portrays an interacting event comprising a plurality of interactions between a first individual and a second individual, and the relationship graph comprises a first node, a second node, and a first edge extending from the first node to the second node. The first node represents the first individual, the second node represents the second individual, and a weight of the first edge represents a relationship strength between the first individual and the second individual. The relationship score is determined using a first computer-implemented machine learning model.

DETAILED DESCRIPTION

The present disclosure relates to systems and methods for evaluating relationship strength of a group of individuals based on video data of the individuals interacting with other members of the group. As will be explained in more detail subsequently, the systems and methods described herein allow for generation of a relationship score that represents the overall relationship strength of a group captured in video data. The systems and methods disclosed herein further allow for tracking of relationship strength over time and determinations of trends in relationship strength.

Advantageously, the relationship scores produced by the systems and methods disclosed herein can approximate the success of an event in which a group of individuals were interacting. For example, a high relationship strength among a group of individuals in a work meeting can indicate that individuals were communicating and collaborating to a high degree. A high degree of communication and collaboration can, in turn, indicate that a meeting is a success. Accordingly, a meeting in which a group of individuals exhibited strong relationships is likely to be a successful meeting. As a further example, a high relationship strength in a sales event can indicate that a salesperson is connecting well with a potential buyer. A salesperson's ability to connect with a potential buyer is suggestive of the salesperson's ability to make a sale to the potential buyer. Accordingly, a sales event in which a salesperson and a potential buyer exhibited strong relationships is likely to be a successful sales event that leads to a purchase by the potential buyer.

Figure 1:
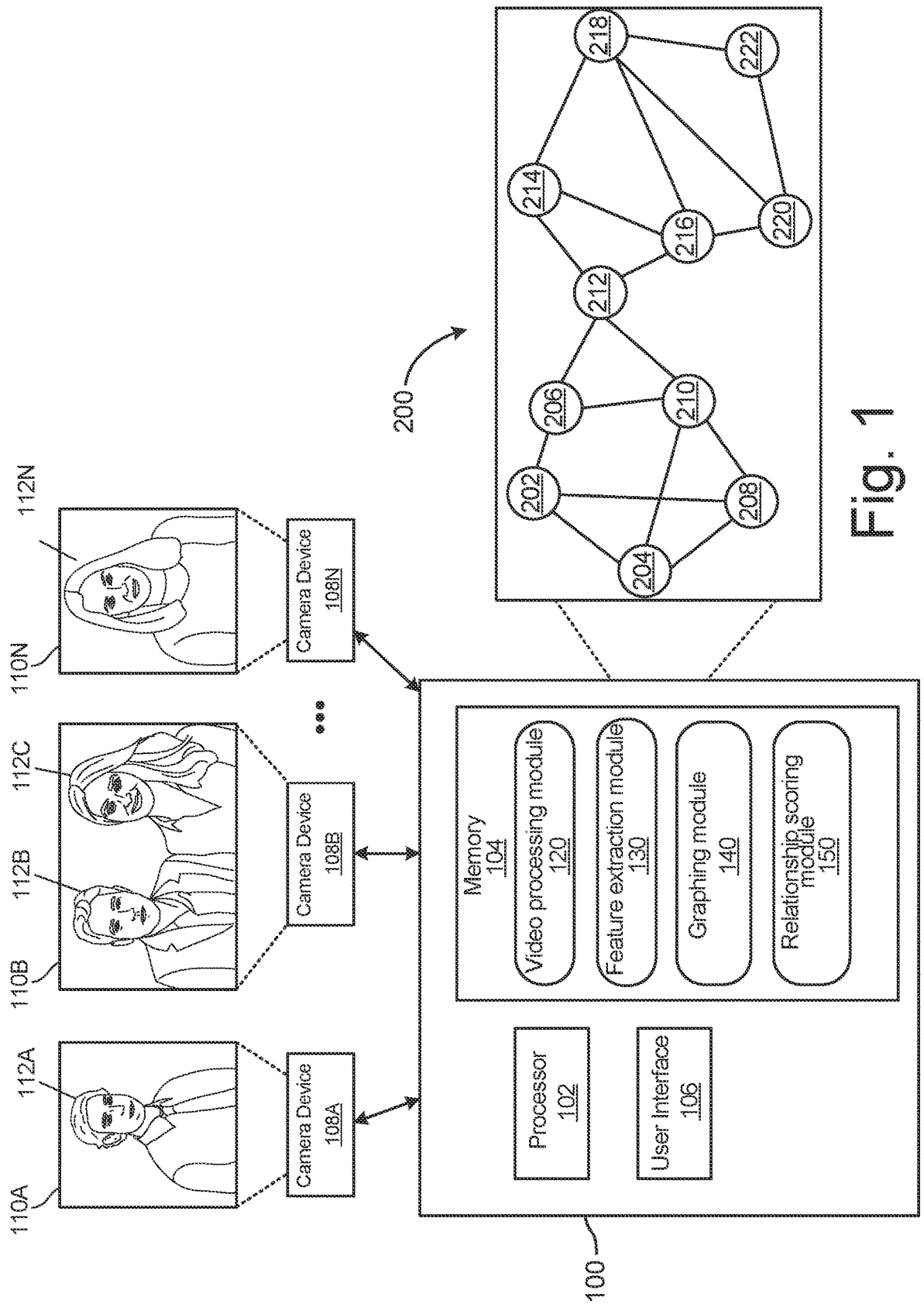
FIG. 1 is a schematic diagram of an example of a system for relationship evaluation.

FIG. 1 is a schematic diagram of relationship evaluator 100, which is a system for evaluating relationships of two or more individuals. Relationship evaluator 100 includes processor 102, memory 104, and user interface 106, and is connected to camera devices 108A-N. Camera devices 108A-N capture video data 110A-N of individuals 112A-N. Memory 104 includes video processing module 120, feature extraction module 130, graphing module 140, and relationship scoring module 146. Memory 104 also stores relationship graph 200, which is an edge and node graph created by graphing module 140. Relationship graph 200 includes nodes 202, 204, 206, 208, 210, 212, 214, 216, 218, 220, and 222. Each of nodes 202, 204, 206, 208, 210, 212, 214, 216, 218, 220, 222 are connected to another of nodes 202, 204, 206, 208, 210, 212, 214, 216, 218, 220, 222 by at least one edge.

Processor 102 can execute software, applications, and/or programs stored on memory 104. Examples of processor 102 can include one or more of a processor, a microprocessor, a controller, a digital signal processor (DSP), an application specific integrated circuit (ASIC), a field-programmable gate array (FPGA), or other equivalent discrete or integrated logic circuitry. Processor 102 can be entirely or partially mounted on one or more circuit boards.

Memory 104 is configured to store information and, in some examples, can be described as a computer-readable storage medium. Memory 104, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 104 is a temporary memory. As used herein, a temporary memory refers to a memory having a primary purpose that is not long-term storage. Memory 104, in some examples, is described as volatile memory. As used herein, a volatile memory refers to a memory that that the memory does not maintain stored contents when power to the memory 104 is turned off. Examples of volatile memories can include random access memories (RAM), dynamic random access memories (DRAM), static random access memories (SRAM), and other forms of volatile memories. In some examples, the memory is used to store program instructions for execution by the processor. The memory, in one example, is used by software or applications running on relationship evaluator 100 (e.g., by a computer-implemented machine learning model or a data processing module) to temporarily store information during program execution.

Memory 104, in some examples, also includes one or more computer-readable storage media. Memory 104 can be configured to store larger amounts of information than volatile memory. Memory 104 can further be configured for long-term storage of information. In some examples, memory 104 includes non-volatile storage elements. Examples of such non-volatile storage elements can include, for example, magnetic hard discs, optical discs, floppy discs, flash memories, or forms of electrically programmable memories (EPROM) or electrically erasable and programmable (EEPROM) memories.

User interface 106 is an input and/or output device and enables an operator to control operation of relationship evaluator 100. For example, user interface 106 can be configured to receive inputs from an operator and/or provide outputs. User interface 106 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

Relationship evaluator 100 is configured to perform one or more methods described herein. Relationship evaluator 100 can accept data from and/or can be operably connected to an audiovisual data stream and/or an audiovisual data file. Relationship evaluator 100 can also use data from an audiovisual data stream and/or an audiovisual data file to create relationship graph information. More generally, relationship evaluator 100 is configured to perform any of the functions attributed herein to a relationship evaluator, including receiving an output from any source referenced herein, detecting any condition or event referenced herein, and generating and providing data and information as referenced herein.

Relationship evaluator 100 can be a discrete assembly or be formed by one or more devices capable of individually or collectively implementing functionalities and generating and outputting data as discussed herein. In some examples, relationship evaluator 100 can be implemented as a plurality of discrete circuitry subassemblies. In some examples, relationship evaluator 100 can include or be implemented at least in part as a smartphone or tablet, among other options. In some examples, relationship evaluator 100 and/or user interface 106 of relationship evaluator 100 can include and/or be implemented as downloadable software in the form of a mobile application. The mobile application can be implemented on a computing device, such as a personal computer, tablet, or smartphone, among other suitable devices. Relationship evaluator 100 can be considered to form a single computing device even when distributed across multiple component devices.

Camera devices 108A-N are capable of capturing video data 110A-N of one or more individuals 112A-N. In the depicted example, camera devices 108A and 108N are depicted as capturing video data 110A and 110N of single individuals 112A and 112N. Camera device 108B is depicted as capturing video data 110B of two individuals 112B and 112C. Each camera device 108A-N captures video data 110A-N is capable of capturing video of one or more individuals 112A-N. Each camera device 108A-N is configured to be able to communicate with relationship evaluator 100 and relationship evaluator 100 is configured to communicate with each camera device 108A-N. Camera devices 108A-N can be, for example, a video camera, a webcam, or another suitable source for obtaining video data 110A-N. Camera devices 108A-N can be controlled by relationship evaluator 100 or by another suitable video device. Video data 110A-N are audiovisual data feeds portraying individuals 112A-N. Video data 110A-N can be stored to memory 104 for use with one or more methods described herein or can be stored to another storage media and recalled to memory 104 for use with one or more methods described herein.

Although FIG. 1 depicts only three camera devices 108A-N, relationship evaluator 100 can be operatively connected to any number of camera devices 108A-N. Each additional camera device 108A-N can capture video data 110A-N portraying one or more additional individuals 112A-N. Similarly, although each of video data 110A-N is depicted as portraying a single individual 112A-N, in other examples each of video data 110A-N can depict two or more individuals 112A-N. In some examples, relationship evaluator 100 includes only one camera that captures video data of all individuals 112A-N.

Individuals 112A-N are participating in an interacting event. As used herein, an "interacting event" refers to an event where the individuals 112A-N interact with each other through one or more interactions. The interacting event can be, for example, a meeting, a presentation, a sales pitch, a negotiation, or a conference, among other options. Each interaction that occurs during the interacting event is associated with at least two people. For each interaction, one individual performs an action toward at least one other individual, where the actions are selected and/or intended to have an effect on the other individual(s). Each action can include, for example, one or more words, one or more gestures, and/or one or more audible noises, among other options. For example, an individual can orally speak a statement (e.g., one or more sentences expressing an idea, thought, and/or concept) and physically perform one or more gestures to complement the spoken words of the statement. The statement can be directed at one or more other individuals. In some examples, the statement and the gestures accompanying the statement can be treated as a single interaction. Additionally and/or alternatively, the statement and the gestures accompanying can be treated as separate interactions. Where a statement includes multiple sub-statements that are linguistically separable, each sub-statement can also be treated as a separate interaction.

Video processing module 120 includes one or more programs for processing video data 110A-N. For example, video processing module 120 can include one or more programs for extracting image data, audio data, and semantic text data from video data 110A-N. As used herein, "image data" refers to the portion of video data 110A-N that is a series of still images, "audio data" refers to the sound data stored in video data 110A-N, and "semantic text data" refers to data that represents spoken words, phrases, sentences, and other sounds produced by the individual as readable text.

Feature extraction module 130 includes one or more programs for classifying the image data, audio data, and semantic text data extracted by video processing module 120. Feature extraction module 130 can include one or more programs for extracting classifiable features from the image data, audio data, and/or semantic text data. In some examples, feature extraction module 130 can include one or more computer-implemented machine learning models for extracting classifiable features from the image data, audio data, and/or semantic text data. The features extracted by feature extraction module 130 describe interactions captured by camera devices 108A-N.

Graphing module 140 includes one or more programs for transforming features extracted by feature extraction module into a relationship graph. Each relationship graph created by graphing module 140 includes a plurality of nodes and a plurality of edges. Each node of a relationship graph represents each of individuals 112A-N involved in a particular interacting event and each edge is representative of one or more features extracted by feature extraction module 130 from video data 110A-N of that interacting event. Graphing module 140 includes one or more programs for identifying individuals and creating nodes of a relationship graph. Similarly, graphing module 140 includes one or more programs for transforming features extracted by feature extraction module 130 into edges that connect the nodes of the relationship graph.

Processor 102 can use programs of graphing module 140 and information describing the identities of individuals 112A-N to create the nodes of the relationship graph. The identity information can be determined by, for example, analyzing data from video processing module 120 with one or more programs of feature extraction module 130 to identify features representative of identity. For example, graphing module 140 can also include one or more programs for identifying individuals 112A-N in video data 110A-N based on features extracted by feature extraction module 130. Graphing module 140 can further include one or more programs for associating features extracted by feature extraction module 130 with each of individuals 112A-N. An individual 112A-N can be identified by, for example, cross-referencing features with a table or array that relates features to identity. Additionally and/or alternatively, a machine learning model trained to identify an individual 112A-N based on a training set of features from image, audio, and/or semantic text data can be used to identify individuals 112A-N for creating nodes of the relationship graph. In examples where the individual 112A-N is identified, the nodes of the relationship graph can include, for example, descriptions of the name, title, or organizational position of the individual 112A-N, among other options. In other examples, descriptive identity information may not be available for one or more of individuals 112A-N. In these examples, the nodes of the relationship graph can include descriptions of the physical appearance, setting, built environment, or geographic location of the individual 112A-N, among other options. Feature extraction module 130 and/or graphing module 140 can include one or more programs for determining physical and/or environmental descriptions for each individual 112A-N represented as a node of the relationship graph.

Graphing module 140 can include one or more programs for creating an edge from each feature extracted by feature extraction module 130. Each feature extracted by feature extraction module 130 can be associated with at least one individual of individuals 112A-N captured in video data 110A-N by cameras 108A-N, such that each edge of the relationship graph can be associated with at least one node of the relationship graph. Graphing module 140 can also include one or more programs that, for each edge, are able to associate the edge with the nodes representative of the individuals associated with the feature represented by the edge. For example, for a feature that describes a statement (e.g., a feature that describes words spoken in the statement), can be associated with the speaker and/or the recipients of the statement. Processor 102 can use one or more programs of graphing module 140 to create an edge for each recipient of the statement and to associate those edges with the speaker, such that for each recipient of the statement, processor 102 creates an edge extending from the speaker to the recipient. In some examples, the features extracted by feature extraction module 130 are associated with all individuals involved in the interaction. Feature extraction module 130 and/or graphing module 140 can include one or more programs to automatically determine the individual that initiated an interaction described by the feature and further to determine individuals that were the intended recipients of that interaction. As will be described in more detail subsequently, the edges created using the programs of graphing module 140 can be directed or undirected and can also be weighted or unweighted.

Processor 102 can use programs of graphing module 140 to create a relationship graph for an interacting event by organizing the node and edge data for the interacting event. The relationship graphs created by graphing module 140 represent the relationships of individuals 112A-N as captured in video data 110A-N of an interacting event. Advantageously, organizing feature data extracted by feature extraction module 130 into the node and edge relationship graphs created by the programs of graphing module 140 significantly improves the ease with which patterns and data of relationships can be identified within an extracted feature set for a particular interacting event. The relationship graph created by graphing module 140 can be represented as a table, a database, or a graphical image, among other options. In some examples, all edges extending between two nodes are combined into a single, weighted edge in the relationship graph data. In other examples, each edge is stored separately in the relationship graph. In some of these examples, the relationship graph also stores descriptions of the features corresponding to each edge, allowing analysis for the presence and/or absence of particular interactions during the interacting event represented by the relationship graph.

Relationship scoring module 146 includes one or more programs for scoring the quantity and quality of the relationships depicted in a relationship graph of an interacting event created using graphing module 140. A relationship graph can be scored according to the quantity and/or weight of the edges connecting the nodes of the relationship graph. In some examples, the number of individuals 112A-N participating in the interacting event (i.e., the number of nodes of the relationship graph) and/or the duration of the interacting event may affect the number of edges present in the relationship graph created using graphing module 140. To compensate for this, the relationship score created using relationship scoring module 146 can be normalized based on the number of nodes present in the relationship graph and/or the length of the interacting event. In some examples, relationship scoring module 146 can include one or more machine learning models for generating a relationship score based on a relationship graph. The machine learning model(s) can be trained to associate relationship score with edge quantity and/or weight using a training set of relationship graphs labeled with relationship scores.

The relationship score created using relationship scoring module 146 can be output to one of the individuals 112A-N portrayed in the video data of the interacting event via user interface 106. Additionally and/or alternatively, the relationship score can be output to another individual interacting with and/or supervising the group of individuals portrayed in the video data of the interacting event. For example, if the individuals 112A-N are employees of a company and the interacting event is a periodically recurring meeting, the relationship score can be presented to the employees directly to allow the employees have an estimate of their relationship strength and, if desired, take individual steps to improve their relationship strength. The relationship score can also be presented to an individual who is responsible for managing the employees, such as an employer or supervisor, to be appraised of their relationship strength and, if desired, take managerial steps to improve that relationship strength.

Different edge quantities, edge weights, and/or patterns of connectedness may indicate relationship strength in an application-specific manner. For example, for a given interacting event, a high degree of connectedness (e.g., at least one edge extending between each node of the relationship graph) may be more important than the number of edges extending between each node and/or the weight of those edges. For a different type of interacting event, having few nodes that are strongly connected (e.g., by a large quantity of edges and/or by strongly weighted edges) may indicate a strong connection. For yet a further type of interacting event, both the degree of connectedness and the strength of connection may be equally or substantially equally important. A user, such as one of individuals 112A-N or another individual, can input the type of interacting event at user interface 106. The input can be stored and used by relationship scoring module 146 to score the relationship graph of the interacting event created by graphing module 140. In some examples using a computer-implemented machine learning model to score relationship graphs, multiple computer-implemented machine learning models can be trained for different types of interacting events. In these examples, processor 102 can use the input at user interface 106 select the correct computer-implemented machine learning model for scoring the type of interacting event indicated by the input.

Relationship graphs created using graphing module 140 can be stored to memory 104 for analysis with relationship scoring module 146 and/or with one or more other programs stored on memory 104. For a given group of individuals, a series of historical relationship graphs describing relationships among the group of individuals over time can be created using programs of video processing module 120, feature extraction module 130, and/or graphing module 140. The graphs created using graphing module 140 can be scored using relationship scoring module 146 to track relationship strength of the group over time. After each interacting event, a group's historical relationship score can also be displayed using user interface 106.

Memory 104 can also include one or more programs for recognizing an interacting event. Each relationship graph generated by graphing module 140 describes one interacting event. However, in some examples video data 110A-N can include footage of more than one interacting event (e.g., footage of two consecutive interacting events). Memory 104 can include one or more programs for recognizing interacting events in a continuous video recording of multiple interacting events and for isolating the video data for each event. The video data for each event can then be processed using video processing module 120, feature extraction module 130, graphing module 140, and relationship scoring module 146.

Relationship graph 200 is one example of a relationship graph that can be created by graphing module 140. Relationship graph 200 can be stored to memory 104 and can be scored using relationship scoring module 146. Relationship graph 200 includes nodes 202-222, which are connected by various edges. Node 202 is connected to nodes 204, 206, and 208. Node 204 is connected to nodes 202, 208, and 210.

Node 206 is connected to nodes 202, 210, and 212. Node 208 is connected to nodes 202, 204, and 210. Node 210 is connected to nodes 204 and 206. Node 212 is connected to nodes 206, 210, 214, and 216. Node 214 is connected to nodes 212, 216, and 218. Node 216 is connected to nodes 212, 214, 218, and 220. Node 218 is connected to nodes 214, 216, 220, and 222. Node 220 is connected to nodes 216, 218, and 222. Node 222 is connected to nodes 218 and 220. Relationship graph 200 is a visual, plotted depiction of relationship graph information. The information depicted in relationship graph 200 can be stored in other manners (e.g., as a table, array, or database). The plotted depictions of relationship graphs herein are not limiting and are included for explanatory purposes.

The nodes of relationship graph 200 are arranged into two sub-groups. Specifically, nodes 202-210 form one subgroup that is linked to a second subgroup of nodes 214-222 by node 212. If, for example, relationship graph 200 described a meeting of workers in a hierarchically-arranged office environment, the arrangement of workers within the office hierarchy can be inferred from the from the distribution of nodes 202-222 and the edges interconnecting nodes 202-222. For example, it can be inferred that the individuals represented by nodes 206, 210, 216, and 214 are in a middle-management role between the individual represented by node 212, who likely has elevated managerial and/or decision-making duties, and the individuals represented by nodes 202, 204, 207, 218, 220, and 222, who likely are low-level workers with few or no managerial responsibilities.

Further, one of individuals represented by nodes 200-222 or an individual interacting with the individuals represented by nodes 200-222 can inspect relationship graph 200 to understand the relationship dynamics among the group of individuals represented by nodes 200-222. For example, if a salesperson is making a sales pitch to the individuals represented by nodes 200-222, the salesperson could inspect relationship graph 200 to identify the individual represented by node 212 as an individual with decision-making authority, and the salesperson could tailor their sales pitch toward the individual represented by node 212. As a further example, relationship graph 200 could be used by the individuals represented by nodes 200-212 to understand the effectiveness of their organizational hierarchy or management structure. As described with respect to the previous example, the structure of relationship graph 200 implies that the individual represented by node 212 has the highest position in an organizational hierarchy among the individuals represented by nodes 200-222. If, however, the individual represented by node 222 is designated as having highest position in the organizational hierarchy, the structure of relationship graph 200 implies that, despite their designation, the individual represented by node 222 is not who the other individuals represented by nodes 200-220 look to for leadership and/or management. In this example, the structure of relationship graph implies one or more defects in the organizational structure and/or in the managerial capabilities of the individual represented by node 222.

In some examples, nodes 200-222 can be labeled according to the role of the individual represented by the node in an organizational hierarchy, and the labels can be used also be used by relationship scoring module 146 to create a relationship score for the interacting event represented by relationship graph 200. For example, if node 222 is labeled as the highest-ranking role in an organizational hierarchy, in examples where it is undesirable for that node to only be connected to two other nodes, relationship graph 200 can be scored lower than if node 212 was labeled as the highest-ranking role. A user can input the roles of each node to a user interface, such as user interface 106, for use with creating a relationship score.

Relationship graph 200, including nodes 200-222 and the depicted arrangement of nodes 200-222, is a non-limiting example and is provided for explanatory purposes. In other examples, relationship graph 200 could have a different quantity of nodes and/or the nodes of relationship graph could have a different arrangement (i.e., by having a different set of edges). Similarly, the programs stored on memory 104 (e.g., those of video processing module 120, feature extraction module 130, graphing module 140, and relationship scoring module 146) can be used to create and evaluate other relationship graphs.

FIGS. 2-5 are schematic depictions of other examples of plotted relationship graphs that can be produced using graphing module 140 and scored using relationship scoring module 146. Like relationship graph 200, the relationship graphs depicted in FIGS. 2-5 are shown as plotted graphs. Each of FIGS. 2-5 depicts the same four individuals as nodes 272, 274, 276, 278. However, each of FIGS. 2-5 depicts an alternative arrangement and/or type of edges describing the interactions of an interacting event between the individuals represented by nodes 272-278.

Figure 2:
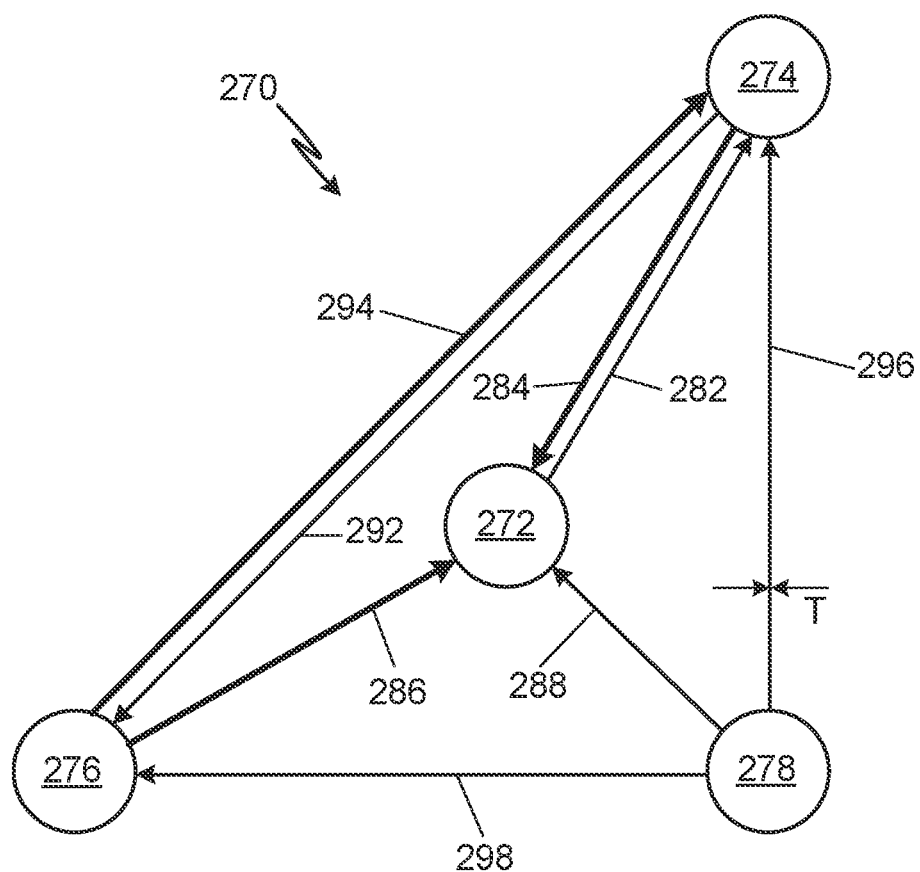
FIG. 2 is a schematic diagram of an example of a plotted relationship graph that can be created by the system of FIG. 1.

FIG. 2 is a schematic depiction of relationship graph 270, which includes nodes 272-278 and edges 282-298. Relationship graph 270 is a weighted, directed graph, such that each of edges 282-298 has a direction (indicated by an arrowhead) and a weight. In FIG. 2, each of edges 282-298 has a thickness T that is representative of the weight of the edge. Each of nodes 272, 274, 276, 278 are connected to each other of nodes 272, 274, 276, 278 by at least one of edges 282-298. Edge 282 extends from node 272 to node 274, edge 284 extends from node 274 to node 272, edge 286 extends from node 276 to node 274, edge 288 extends from node 278 to node 272, edge 292 extends from node 274 to node 276, edge 294 extends from node 276 to node 274, edge 296 extends from node 278 to node 274, and edge 298 extends from node 278 to node 276. The direction of edges 282-298 can convey the direction of interactions between the individuals represented by nodes 272-278, among other options. For example, edge 282 can represent interactions initiated by the individual represented by node 272 and directed toward the individual represented by node 274. Similarly, edge 284 can represent interactions initiated by the individual represented by node 274 and directed toward the individual represented by node 272. As is indicated by the relative thicknesses of edges 282 and 284 (indicative of the weight of edges 282 and 284), the individual represented by node 274 initiated significantly more interactions that were directed toward the individual represented by node 272 than the individual represented by node 272 initiated in the reverse direction (i.e., toward the individual represented by node 274). Further, as is indicated by the direction of edges 292, 294, and 296, the individual represented by node 274 did not initiate interactions with the individual represented by node 278 but did initiate interactions with the individual represented by node 276. The weights of edges 292 and 284 indicate that the individual represented by node 274 initiated significantly more interactions with the individual represented by node 272 than the individual represented by node 276. Whether an individual is an initiator and/or recipient of an interaction can be determined based on the features extracted by feature extraction module 130. Other aspects of the relationships of the individuals represented by nodes 272-278 not discussed herein can be determined based on the directions and weights of edges 282-298.

Figure 3:
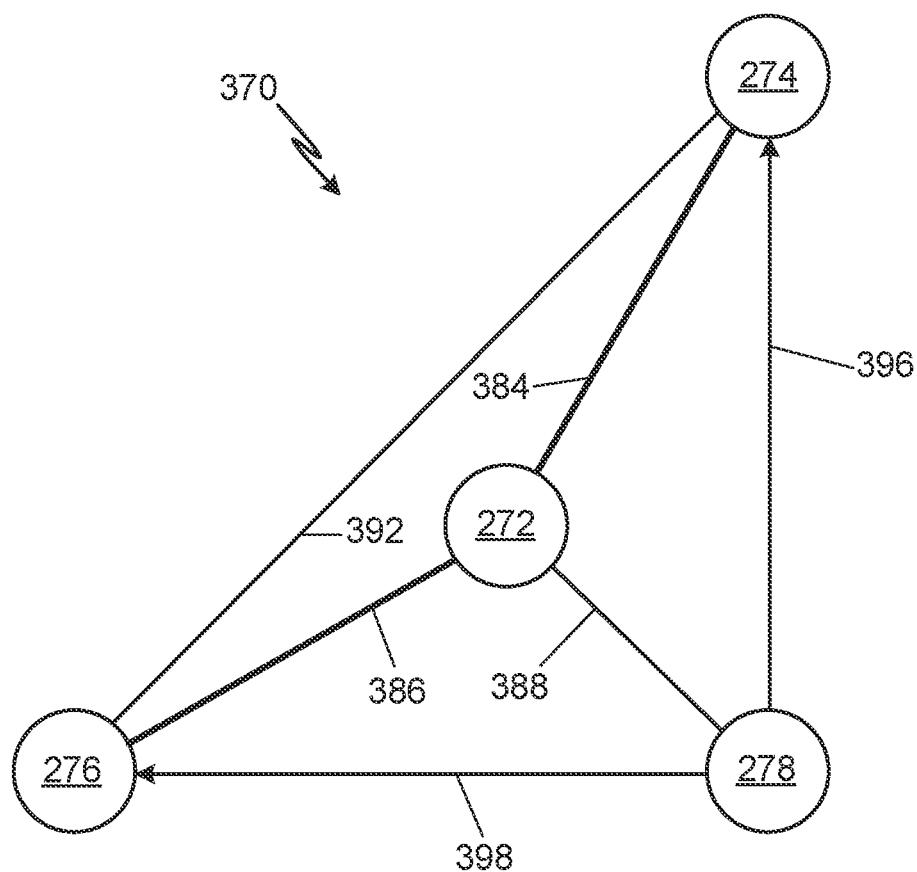
FIG. 3 is a schematic diagram of another example of a plotted relationship graph that can be created by the system of FIG. 1.

FIG. 3 is a schematic depiction of relationship graph 370, which is another example of a relationship graph that can be produced using graphing module 140. Relationship graph 370 includes nodes 272-278 connected by edges 384-398. Relationship graph 370 is a weighted and undirected graph, such that each of edges 384-398 has a weight, but unlike edges 282-298, edges 384-398 do not have directions or orientations. Like edges 282-298 (FIG. 2), each of edges 384-398 has a thickness that is representative of the weight of the edge. In FIG. 3, each of nodes 272, 274, 276, 278 are connected to each other of nodes 272, 274, 276, 278 by at least one of edges 384-398. Edge 384 extends between nodes 272 and 274, edge 386 extends between nodes 272 and 276, edge 388 extends between node 272 and node 278, edge 392 extends between nodes 274 and 276, edge 396 extends between nodes 274 and 278, and edge 398 extends between nodes 276 and 278. As edges 384-398 are unweighted, relationship graph 370 does not store information related to which individual(s) of those represented by nodes 272-278 initiated interactions and/or which individual(s) were the intended recipients of those interactions. Unweighted edges can be advantageous to describe interactions that do not have a clear initiator and/or recipient. For example, if two individuals make incidental eye contact during an interacting event, the eye contact may be a useful interaction for describing the group relationship and generating a relationship score with relationship scoring module 146, but it may be difficult to discern who initiated the incidental eye contact. Relationship graph 370 condenses the quantity and/or quality of interactions between each individual into a single, weighted edge. Accordingly, relationship graph 370 conveys the overall strength of connection between the individuals represented by nodes 272-278. For the depicted example, the connection between the individuals represented by nodes 272 and 274 and the connection between the individuals represented by nodes 272 and 276 are stronger than the connections between other combinations of individuals.

Figure 4:
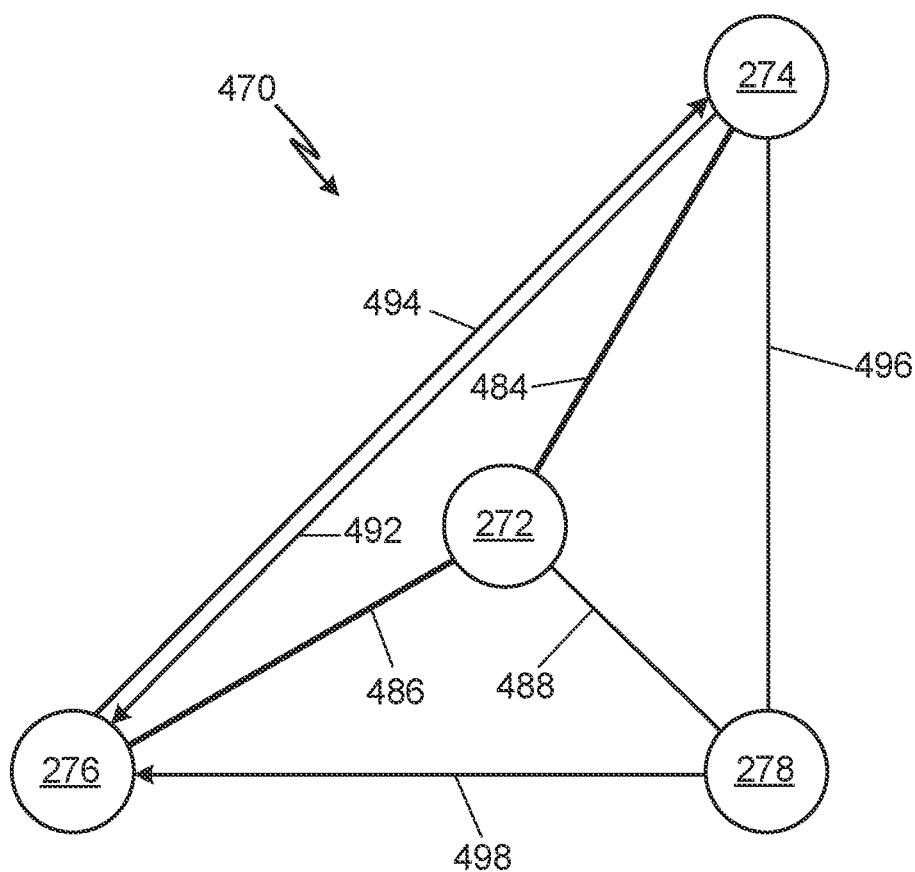
FIG. 4 is a schematic diagram of a further example of a plotted relationship graph that can be created by the system of FIG. 1.

FIG. 4 is a schematic depiction of relationship graph 470, which a further example of a relationship graph that can be produced using graphing module 140. Relationship graph 470 includes nodes 272-278 connected by edges 484-498. Relationship graph 470 is a weighted graph, such that each of edges 384-398 has a weight. Unlike relationship graphs 270 and 370 (FIGS. 2-3), however, relationship graph 470 includes a mixture of undirected and directed edges. Relationship graph 470, accordingly, is able to store information relating to features extracted from interactions that have a discernable initiator and/or recipient and interactions that do not have a clear initiator and/or recipient. In FIG. 4, each of nodes 272, 274, 276, 278 are connected to each other of nodes 272, 274, 276, 278 by at least one of edges 484-498. Edge 484 is undirected and extends between nodes 272 and 274, edge 486 is directed and extends from node 276 to node 278, edge 488 is undirected and extends between nodes 272 and 278, edge 492 is directed and extends from node 274 to node 276, edge 494 is directed extends from node 276 to node 274, edge 496 is undirected and extends between nodes 274 and 278, and edge 498 is directed and extends from node 278 to node 276. Edges 486, 492, and 494 are directed and, accordingly, store initiator and/or recipient information. Edges 484, 488, and 496 are unweighted and do not store initiator and/or recipient information.

The edges of the plotted depictions of relationship graphs 270, 370, and 470 in FIGS. 2-4 are weighted and can represent a combination of multiple interactions. Using relationship graph 470 (FIG. 4) as an example, edge 486 may represent a single, weighted value reflective of all interactions initiated by the individual represented by node 276 and directed to the individual represented by node 272. Using weighted values can, as highlighted by this example, condense many values into a single value, which may simplify scoring of the relationship graph by relationship scoring module 146. Due to the use of weighted edges, no more than two directed edges or one undirected edge extends between any pair of nodes 272-278 in relationship graphs 270, 370, and 470 (FIGS. 2-4, respectively). In other examples, it may be advantageous to combine interactions into multiple groups of interactions (e.g., by type of category of interaction) and/or to not combine some or all interactions, such that the relationship graph is a multigraph and multiple edges extend between certain pairs of nodes 272-278.

Figure 5:
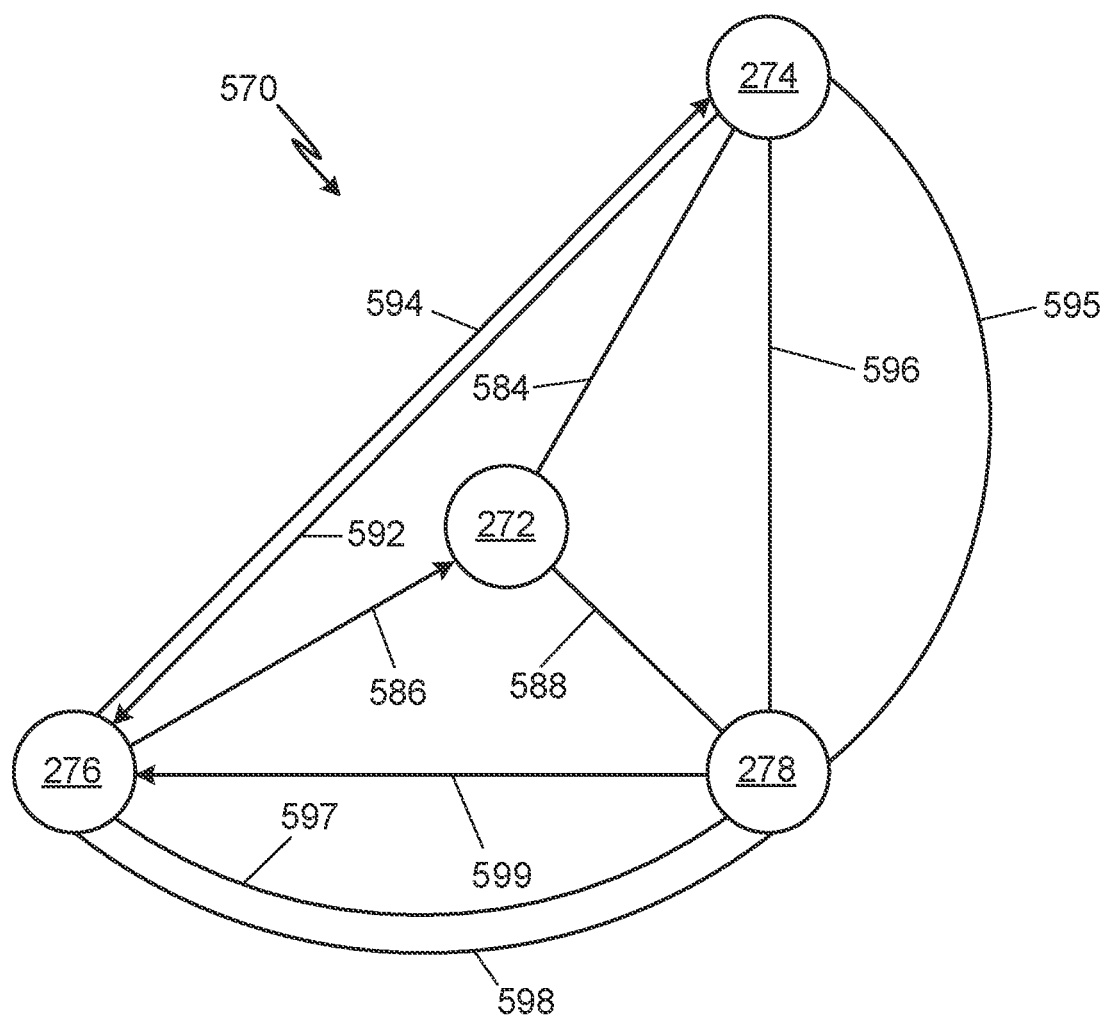
FIG. 5 is a schematic diagram of a further example of a plotted relationship graph that can be created by the system of FIG. 1.

FIG. 5 is a schematic depiction of relationship graph 570, which is a further example of a relationship graph of an interacting event. Relationship graph 570 includes nodes 272-278 connected by edges 584-599. Relationship graph 570 is a multigraph, such that multiple edges extend between certain pairs of nodes 272-278. Accordingly, different edges extending between the same pair of nodes 272-278 can correspond to different interactions and/or different groups of interactions. Like relationship graph 470 (FIG. 4), relationship graph 570 includes a mixture of undirected and directed edges. Relationship graph 570, accordingly, is able to store information relating to features from interactions that have a discernable initiator and/or recipient and interactions that do not have a clear initiator and/or recipient. For clarity and explanatory purposes, relationship graph 570 is not depicted as a weighted graph, but in other examples a relationship graph created by graphing module 140 can be a multigraph that includes weighted edges. Similarly, while relationship graph 570 is a multigraph that includes a combination of directed and undirected edges, graphing module 140 can also be configured to create multigraphs including only directed edges as well as multigraphs including only undirected edges.

In FIG. 5, each of nodes 272, 274, 276, 278 are connected to each other of nodes 272, 274, 276, 278 by at least one of edges 584-599. Edge 584 is undirected and extends between nodes 272 and 274, edge 586 is directed and extends from node 276 to node 272, edge 588 is undirected and extends between nodes 272 and 278, edge 592 is directed and extends from node 274 to node 276, edge 594 is directed and extends from node 276 to node 274, edges 595 and 596 are undirected and extend between nodes 274 and 278, edges 597 and 598 are undirected and extend between nodes 276 and 287, and edge 599 is directed and extends from node 278 to node 276.

As depicted in FIG. 5, a combination of directed and undirected edges can also extend between pairs of nodes of a relationship graph. Using edges 597-599 as examples, edges 597 and 598 may represent one or more interactions or features of an interaction where there was not a clear initiator and/or recipient. Conversely, edge 599 represents one or more interactions or features of an interaction initiated by the individual represented by node 278 and directed toward the individual represented by node 276. The edges of relationship graph 570 are arranged for explanatory purposes and in other examples, other arrangements of undirected and/or directed edges between different arrangements and/or quantities of nodes are possible.

In FIGS. 2, 3, and 4, edge weight is depicted by line thickness. Line thickness is only one example of a method of conveying a numeric edge weight value, and in other examples edge weight can be conveyed or denoted in a different manner on a plotted graph. For example, one or more numerals describing the weight of the edge placed adjacent to the edge can be used to convey weight in a plotted graph.

The relationship graphs shown in FIGS. 1-5 are plotted diagrams having drawn nodes and drawn edges connecting nodes. In examples where graphing module 140 produces a plotted depiction of a relationship graph, relationship scoring module 146 can create a relationship score based on a plotted graph. For example, a plotted graph can be stored as an image to memory 104 and an image hash can be created from the image. Relationship scoring module 146 can include one or more programs for generating a relationship score based on an image hash, such as one or more machine learning models trained to generate relationship scores based on image hash data. In other examples, the relationship graphs produced by graphing module 140 are represented by text and/or numeric data and relationship scoring module 146 is able to create a relationship score based on the text and/or numeric data. For example, the relationship graph created by graphing module 140 can be one or more tables or arrays describing the nodes and edges of the graph. As a specific example, the relationship graph can be a node table describing the nodes of the graph (e.g., by describing the identities or individuals the nodes correspond to) and an edge table describing the edges of the graph (e.g., by describing the feature(s) represented by the edge and the connectivity of the edge). All features represented by the plotted diagrams shown in FIGS. 1-5, such as edge weights or directed/undirected edge information, can be stored in as part of tabular node and edge data. Text and/or numeric data representing a relationship graph can be stored as a table, an array, and/or a database to memory 104 or another suitable storage device, including one or more physical and/or virtual storage devices, for use by relationship scoring module 146 and/or another program stored on memory 104. In these examples, relationship scoring module 146 can include one or more programs for generating a relationship score based on tabular, arrayed, and/or database representations of relationship graphs, such as one or more trained machine learning models.

As will be explained in more detail subsequently, the relationship graphs described herein provide a flexible solution for modeling relationship dynamics within a group of individuals. The relationship graphs described herein can be constructed passively based on video data of members of the group. The use of video data, and in some examples a combination of image, audio, and semantic text data derived from the video data, allows for improved understanding of the quality of interpersonal interactions as compared to existing methods. For example, two individuals in a group may have a large number of sarcastic interactions suggestive of a negative relationship between those two individuals. An existing method may incorrectly assume that based on the volume of interactions, the individuals in fact have a strong relationship. Further, in the case of sarcasm, examining only text data of words spoken by the individuals can cause misinterpretations of the speaker's intent. The methods described herein allow for audio data of sarcastic voice tones from the video data to provide context to the semantic text data. Further, the use of relationship graphs enables representation of individual interactions and/or of the overall connection between each pair of individuals of a group. Existing methods do not provide the granular modeling relationships and/or connections between individuals of a group that is provided by the relationship graphs disclosed herein.

Figure 6:
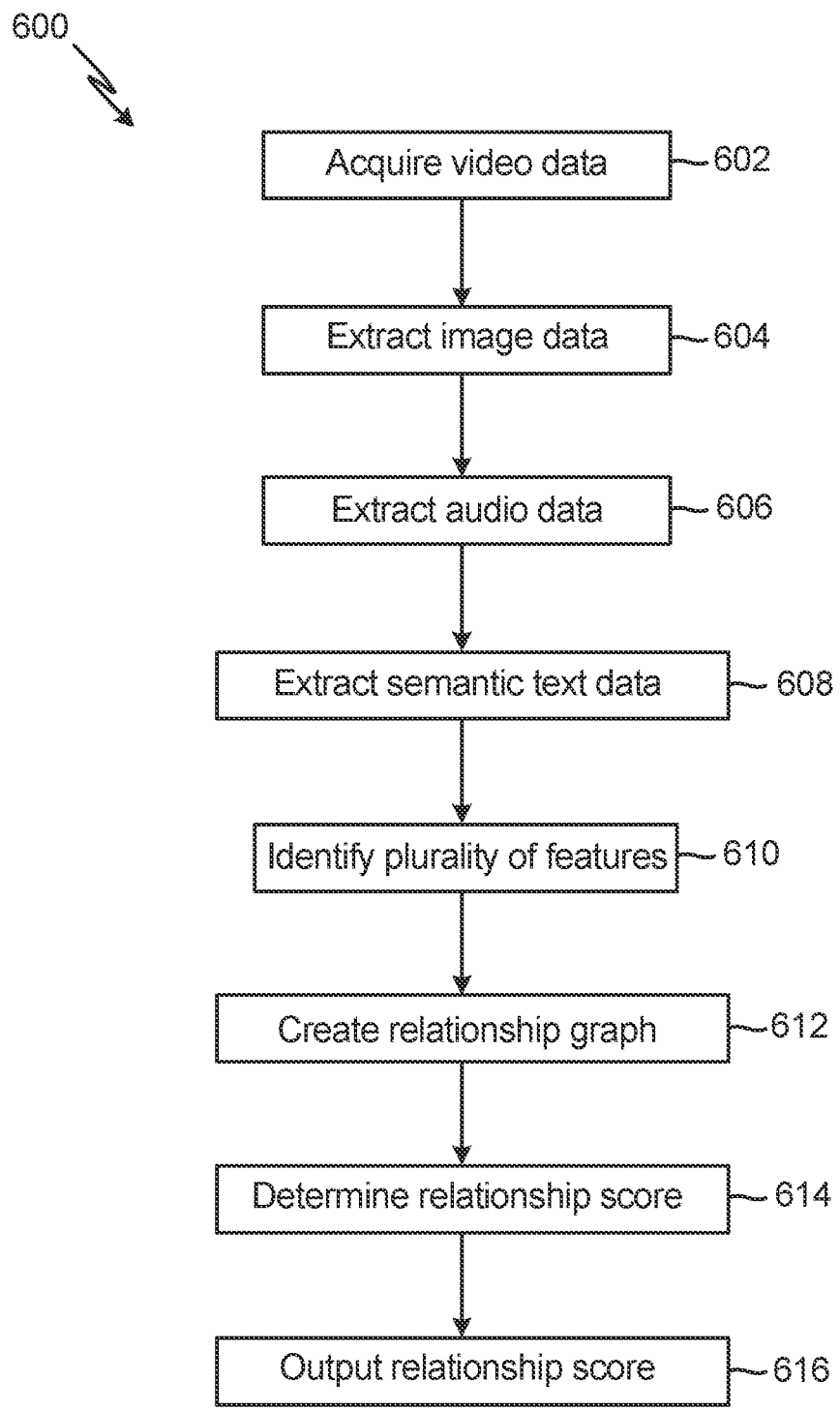
FIG. 6 is a flow diagram of an example of a method of relationship evaluation performable by the system of FIG. 1.

FIG. 6 is a flow diagram of method 600, which is a method of creating a relationship score and is performable by relationship evaluator 100 (FIG. 1). Method 600 includes steps 602-616 of acquiring video data (step 602), extracting image data (step 604), extracting audio data (step 606), extracting semantic text data (step 608), identifying a plurality of features (step 610), creating a relationship graph (step 612), determining a relationship score (step 614), and outputting a relationship score (step 616). Method 600 can be stored to memory 104 of relationship evaluator 100 and executed by processor 102. For explanatory purposes, method 600 will generally be described herein with reference to relationship evaluator 100. However, method 600 can also be performed by any other suitable device or system.

In step 602, video data is acquired. The video data can be any media source having both audio and image components. The video data can be delivered to relationship evaluator 100 from a video source and/or relationship evaluator 100 can request the video data from the video source. The video source can be any suitable source of video, such as a multimedia file or a video stream. The video data can be of any length, but in some examples, the video data is sampled at pre-determined intervals for use with method 600. Method 600 can be performed for each segment of the video data and updated relationship graph information can be provided for each segment.

The video data acquired in step 602 is footage of an interacting event and includes footage of all individuals participating in the interacting event. The video data can be acquired by one or more cameras, where each camera captures video of at least one individual. The video data acquired in step 602 can, for example, one or more of video data 110A-N and be taken by a single camera 108A-N or can be taken by multiple cameras 108A-N. Each camera can capture one or more individuals. In some examples, all individuals of participating in the interacting event can be captured by a single camera (e.g., one of cameras 108A-N) and the video data captured by the camera can be used as the video data acquired in step 602. In other examples, all individuals participating in the interacting event can be captured by multiple cameras and the video data captured by those cameras can be compiled and/or aggregated to from the video data acquired in step 602.

In step 604, image data is extracted from the video data acquired in step 602. The image data is stored to memory 104 as a series of still images for use with later steps of method 600. The image data can be extracted from the video data by processor 102 of relationship evaluator 100 (FIG. 1) with one or more programs of video processing module 120. The image data extracted in step 604 includes all individuals participating in the interacting event that were captured by in the image component of the video footage. In some examples, image data for each individual captured in the video data can be separated to create sets of image data for each individual. Features can be identified for each individual in subsequent step 610 by separately analyzing each set of image data. The image data can be separated by, for example, creating a cropped copy of the image data that only includes a single individual. Processor 102 can identify an individual from the still image data and crop each image of the still image data to include only that individual. Cropped image data sets can be created for each individual in the image data and can be separated analyzed for features in subsequent step 610. Additionally and/or alternatively, the image data can be stored as an unseparated file and features can be extracted in subsequent step 610 from the unseparated image data. The still image data can include one image for each frame of the video data or can be sampled at a pre-determined rate. For example, the video data can be sampled once every three frames to generate the still image data.

In step 606, audio data is extracted from the video data. The audio data is extracted by processor 102 of relationship evaluator 100 (FIG. 1) with one or more programs of video processing module 120 and can be stored to memory 104 for use with later steps of method 600. In some examples, the audio data for each individual can be separated to create sets of audio data for each individual captured in the video data. In some examples, processor 102 can execute one or more programs stored on memory 104 to identify which portions of the audio data in which an individual is communicating and trim the audio data to include only those portions. Trimming the audio data can reduce the file size of the audio data, which can reduce the computational requirements to perform steps 610, 612, and/or 614. The program can be, for example, a computer-implemented machine learning model trained to identify individuals based on voices present in audio data.

Processor 102 can use one or more programs stored to memory 104 to determine which portions of the audio correspond to each individual portrayed in the image data. Processor 102 (FIG. 1) can determine which portions of the audio correspond to each individual by, for example, inspecting metadata of the video data acquired in step 602. For example, if each camera 108A-N captures footage of only a single individual 112A-N, processor 102 can associate image and audio data extracted from video data captured by each camera 108A-N. Additionally and/or alternatively, processor 102 can execute one or more programs to identify individuals present in the image data and individuals present in the audio data. The processor 102 can cross-reference a library of individuals to determine which diarized or trimmed audio files and which portions of the image data correspond to each individual, and associate audio and image data for each individual. Additionally and/or alternatively, the processor 102 can execute one or more programs to analyze the image data and determine when each individual is talking. The processor 102 can then use that timestamp information to determine which portions of the audio file correspond to the each individual and thereby associate audio and image data for each individual.

In step 608, the first semantic text data is extracted. As referred to herein, "semantic text data" refers to data that represents spoken words, phrases, sentences, and other sounds produced by the first portrayed individual as readable text. The semantic text data can be, for example, a transcript of the words spoken in the audio portion of the video data. The semantic text data can be extracted from, for example, the audio data extracted in step 606. Processor 102 of relationship evaluator 100 (FIG. 1) can use one or more programs of video processing module 120 to extract the semantic text data. Semantic text data can be extracted from the audio data using a text-to-speech program or another suitable tool and can be associated to the audio and image data for the individual. Separated semantic text data can be extracted from separated audio data for each individual and associated with the appropriate individual. In other examples, the video data can include a semantic text transcript of words, phrases, sentences, etc. spoken by one or all individuals, and first semantic text data can be extracted directly from the video data. In these examples, the semantic text data can be correlated to the correct individual in the group by, for example, comparing timestamp information to the image and audio data, by comparing the semantic text data extracted from the video data to partial semantic text information derived from an extracted audio data set, or by another suitable method.

In step 610, a plurality of features is identified. Processor 102 can identify and extract features from one or more of the image data extracted in step 604, the audio data extracted in step 606, and the semantic text data extracted in step 608. The plurality of features includes classifiable features related to interactions that occurred during the interacting event and can be used to create a relationship graph in subsequent step 612. Processor 102 can inspect and identify features from one or more of the image data, the audio data, and the semantic text data extracted in steps 604, 606, and 608, respectively. The image data, audio data, semantic text data, or any combination thereof can be selected to create the plurality of features in step 610 based on application or operational need and/or based on use in generating relationship graphs that accurately depict interpersonal relationships. For example, if the group participating in the interacting event (i.e., the group of individuals depicted in the video data) is unlikely to be talking, the features identified in step 610 can include only features derived from the image data extracted in step 604. In other examples, features derivable from the audio data, semantic text data, or a combination of image, audio, and/or text data can be omitted from the plurality of features. Once features have been identified from the image data, the audio data, and/or the semantic text data, processor 102 can store the plurality of features to memory 104 for use with subsequent steps of method 600.

In some examples, one or more computer-implemented machine learning models can be used to extract the plurality of features. Each type of data extracted from the video data can be inspected using one or more software tools to identify features that can be stored to the plurality of features. For example, a first computer-implemented machine learning model can be used to analyze image data and identify classifiable features, a second computer-implemented machine learning model can be used to analyze audio data and identify classifiable features, and a third computer-implemented machine learning model can be used to analyze semantic text data and identify classifiable features.

The image data can be analyzed using, for example, a computer vison model or another machine learning model to identify one or more body language elements that can be stored as features of plurality of features. The body language elements can include, for example, one or more of hand gestures, head tilt, the presence and amount of eye contact, the amount of eye blinking, forehead wrinkling, mouth position, mouth shape, eyebrow shape, and/or eyebrow position. The audio data can be analyzed using, for example, one or more computer-implemented machine learning models to identify features related to information conveyance and/or interpersonal interactions. For example, the features identified from the audio data can be one or more of a vocal tone, a vocal cadence, a vocal pitch, the presence of vocal quavering, intonation, inflection, sentences stress, or another audio element indicative of information conveyance, mood, emotion, or another factor or element relevant to interpersonal communication. The semantic text data can be analyzed using, for example, a natural language understanding model or another machine learning model. The features can be, for example, phonemes, words, phrases, sentences, or other units of language that convey information and are stored in the semantic text data. The features can also be, for example, an intent and/or an entity in the semantic text data. A classifiable intent can include, for example, the intended meaning of a semantic text phrase. A classifiable entity can include, for example, words, phrases, sentences, or other units of language that provide additional context to further describe or classify an intent. In some examples, the model can compare the semantic text transcript of the first portrayed individual to a library of vectorized text data to determine the content of the semantic text data.

Each of the features extracted in step 610 is associated with one or more individuals of the individuals captured in the video data acquired in step 610. Associating the features extracted in step 610 allows for edges representative of those features to be associated with nodes representative of individuals captured in the video data, as will be explained in more detail with respect to subsequent step 612. Processor 102 can use one or more programs of feature extraction module 130 and/or graphing module 140, and/or one or more other programs stored to memory 104 to assign identities to individuals captured in the video data and to associate features with those identities. The identity information for each feature can be stored to memory 104 for use with subsequent steps of method 600.

In some examples, a feature may be directed such that it describes an interaction having a discernable initiator and/or recipient. Feature extraction module 130 can include one or more programs that allow for identification of whether a feature describes an interaction having an initiator and/or recipient and, in some examples, for identifying the initiator and/or recipient. Whether a feature has an initiator and/or recipient and the identities of the initiator and/or recipient can be stored to memory 104 for use with subsequent steps of method 600.

In step 612, a relationship graph is created. Processor 102 can use one or more programs of graphing module 140 to create the relationship graph. The relationship graph includes nodes representative of the individuals captured in the video data acquired in step 602 and edges representative of the features extracted in step 610 extending between those nodes. The number and identity of the nodes can be determined based on the identity information generated for the individuals captured in the video data. The connectivity and, in applicable examples, directions of edges can be determined based on the identities associated with each feature extracted by feature extraction module 130. In examples where the relationship graph is a weighted graph, edge weights can be assigned by one or more programs of graphing module 140 or another program stored to memory 104. For example, features extracted by feature extraction module 130 can be cross-referenced with a table, array, or database that relates features and edge weights, and the cross-referenced edge weights can be used as weights for the edges representative of those features in the relationship graph. Additionally and/or alternatively, edge weight can be determined using a computer-implemented machine learning model trained accept a feature identity as an input and to output an edge weight. In some examples, two or more edges between two nodes can be combined. For example, all edges between nodes can be combined into a single edge representative of the relationship between the two individuals represented by the nodes. As a further example, all edges of a particular category (e.g., all edges representative of body language-related features) can be combined into a single edge representative of that category. In these examples, the weights of the constituent edges can be combined, such as by summation, into a single value representative of the combined edge. Advantageously, combining edges of the relationship graph can reduce the computational power required to create a relationship score in subsequent step 614. The relationship graph created in step 612 can be stored as a table, array, or database to memory 104. In other examples, the relationship graph can be plotted and a plotted depiction of the relationship graph can be stored as an image to memory 104.

In step 614, a relationship score is determined based on the relationship graph created in step 612. Processor 102 can use one or more programs of relationship scoring module 146 to create the relationship score in step 614. In some examples, one or more computer-implemented machine learning models are used to create the relationship score. In some examples, the relationship score can be representative of relationship strength between the individuals represented in the relationship graph. The computer-implemented machine learning model(s) can be trained to associate edge quantity, edge weights, edge connectivity (i.e., the arrangement of edges), and/or edge orientation (i.e., the direction of directed edges) with a numeric value representative of relationship strength. The strength of all relationships depicted in the relationship graph can be combined, such as by summation, averaging, or another suitable technique, to create the relationship score in step 614.

Step 614 can also be performed by comparing the relationship graph produced in step 612 to relationship graphs for interacting events resulting in a positive outcome (e.g., a sale following a sales meeting) and/or a negative outcome (e.g., the lack of a sale following a sales meeting). Whether an event has a positive or negative outcome can be directly correlated to the relationship strength of individuals participating in the interacting event. Accordingly, the relationship graph of a given interacting event can be compared to a predetermined, labeled set of relationship graphs representing positive events and/or negative events to create a relationship score representative of the similarity of relationships between the current event and the relationships expected during a positive and/or negative event. Such a relationship score can be used, in some examples, as an approximate likelihood that the current event was a positive event and/or a negative interacting event. A computer-implemented machine learning model trained to categorize relationship graphs as positive and/or negative can be used to create a relationship score representative of the similarity between the relationships in the interacting event captured in the video data acquired in step 602 and a relationship graph expected for a positive and/or negative interacting event.

In some examples, the relationship graph generated in step 612 can be converted to an image hash prior to scoring by the program(s) of relationship scoring module 146. In these examples, relationship scoring module 146 can include one or more programs for creating an image of the relationship graph generated in step 612, for creating an image hash of the relationship graph image, and for generating a relationship score based on the image hash. In other examples, relationship scoring module 146 can be configured to create a relationship score based on relationship data stored as a table, array, and/or database. In these examples, relationship scoring module 146 can include one or more programs for storing relationship graph information as a table, array, and/or database.

In step 616, the relationship score created in step 614 is output. The relationship score can be output via a user interface, such as user interface 106. The relationship score can be output in any suitable format. For example, the relationship score can be output as a percentage value representative of the ratio of the calculated relationship score and a maximum and/or ideal relationship score. The maximum and/or ideal relationship score can be stored to memory 104 and recalled by processor 102 for use in creating a percentage value in step 616. In other examples, the relationship score can be output as one or more alphanumeric characters representative of the relationship score. The relationship score can be output as alphanumeric characters representing relationship quality on, for example, a letter grading scale (e.g., an A-F scale). Memory 104 can store one or more tables, arrays, and/or databases relating relationships scores calculated using relationship scoring module 146 to letter grades, and processor 102 to cross-reference the table(s), array(s), and/or database(s) to determine the alphanumeric characters representative of the letter grade to be output in step 616.

Figure 7:
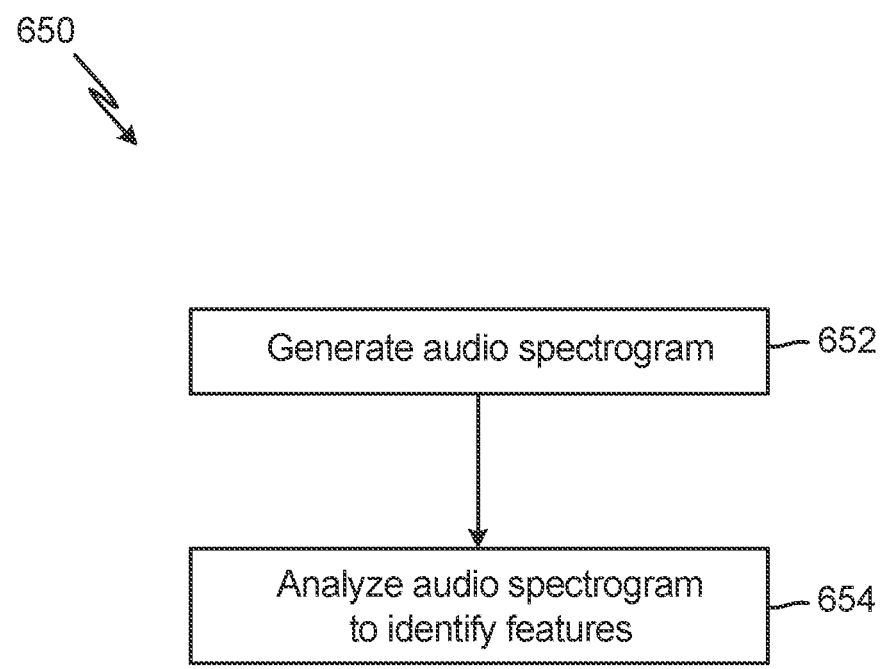
FIG. 7 is a flow diagram of an example of a method of analyzing audio data suitable for use with the method of FIG. 6.

In some examples, the audio data extracted in step 602 can be converted to an audio spectrogram and that can be analyzed in step 610 to identify the plurality of features. FIG. 7 is a flow diagram of method 650, which is a method of analyzing audio data that can be performed during steps 604 and/or 610 of method 600. Method 600 includes steps 652-654 of generating an audio spectrogram (step 652) and analyzing the audio spectrogram to identify features (step 654).

In step 652, the audio data extracted in step 606 is converted to a spectrogram. The spectrogram can describe, for example, the amplitude or frequency ranges of the audio data. In step 654, features present in the audio spectrogram are identified. The features identified in step 654 are features related to information conveyance and/or interpersonal interactions, as described previously with respect to step 610 of method 600 (FIG. 6). In some examples, processing the audio data as an audio spectrogram reduces the computational load required for a processor and/or control circuitry (e.g., processor 102 of relationship evaluator 100) to identify features in the audio data.

The relationship scores created using method 600 are based on the strength and types of connections between individuals of a group. The relationship strength of a group can influence the positivity of outcome associated with a particular interacting event. For example, a high relationship score can be associated with a positive event outcome and a negative relationship score can be associated with a negative event outcome. As a specific example, where the interacting event scored using method 600 is a work meeting, strong relationships may be correlated with a highly productive and/or effective work meeting. Accordingly, the relationship score generated by method 600 can also act as a score for the overall effectiveness of the work meeting. As a further example, where the interacting event is a sales event, strong relationships may be associated with strong client-vendor relations. Accordingly, a relationship score of a sales event can also act as a score for how the overall effectiveness of a sales event.

As relationship score can be correlated to the positivity of the outcome of an interacting event, in some examples, the relationship score produced using method 600 can directly represent the success and/or the outcome of the interacting event. As described previously, the relationship score can be a similarity score that describes the similarity between the relationship graph of an interacting event and the relationship graph expected for positive and/or negative interacting events. Outputting a relationship score representative of the success and/or outcome positivity of an interacting event can, in some examples, be more useful for improving the success of a subsequent event than a score only describing relationship strength, such as where the interacting event is at least partially adversarial in nature.

The scores produced using method 600 can be used to improve subsequent interacting events. For example, a low relationship score can act as an indicator to one or more individuals of the group that the group relationships are poor and need improvement. Improvements can occur in subsequent interacting events of the same type or in other contexts or situations. Notably, improvements to relationship quality can provide a wide range of application-specific benefits. For example, improving relationship quality among members of a work team can advantageously provide concomitant improvements to productivity and work quality. A high relationship score among members of the group can indicate a high willingness to collaborate and communicate, which can be associated with improved productivity and output from the group. As a further example, improving relationship quality between a sales team and a potential buyer (e.g., a customer) can improve sale likelihood and/or sales volume. A high relationship score in an interacting event between a sales team and a potential buyer can indicate a higher likelihood of closing a sale. Where the relationship score produced using method 600 is directly representative of event success, a low score can prompt individuals participating in the interacting event to examine the event and take proactive steps to improve the outcomes of subsequent interacting events.

Further, method 600 is significantly more repeatable than subjective measures of relationship strength, enabling method 600 to be used to more accurately predict changes in relationship strength within one interacting event and/or over multiple interacting events than methods that rely on subjective judgment. Method 600 also allows for automatic and, in some examples, real-time evaluation of the strength of the relationships of a group of individuals. Due to the high repeatability of the scores provided by method 600, method 600 can be repeated over recurring interacting events (e.g., recurring meetings, sales events, etc.) to allow tracking of relationship scores over multiple instances of a recurring event. Method 600 can also be performed repeatedly during a single interacting event to provide real-time or substantially real-time tracking of relationship strength.

The relationship scores generated by method 600 also enable individuals in managerial roles to more easily evaluate relationship strength and take steps to improve relationship quality among a work team. Further, because the relationship scores generated by method 600 can be generated automatically and based only on video data, method 600 enables an individual in a managerial role to improve relationship quality among a work team without having to directly observe interactions among members of the work team. Accordingly, method 600 enables evaluation of the strength of relationships in situations where it is not practical or possible for one individual to observe all interactions among the group and form a subjective opinion of relationship strength. For example, method 600 can improve the ability of individuals with sensory impairments to manage a team of individuals by improving their ability to evaluate and improve relationships among the team.

Figure 8:
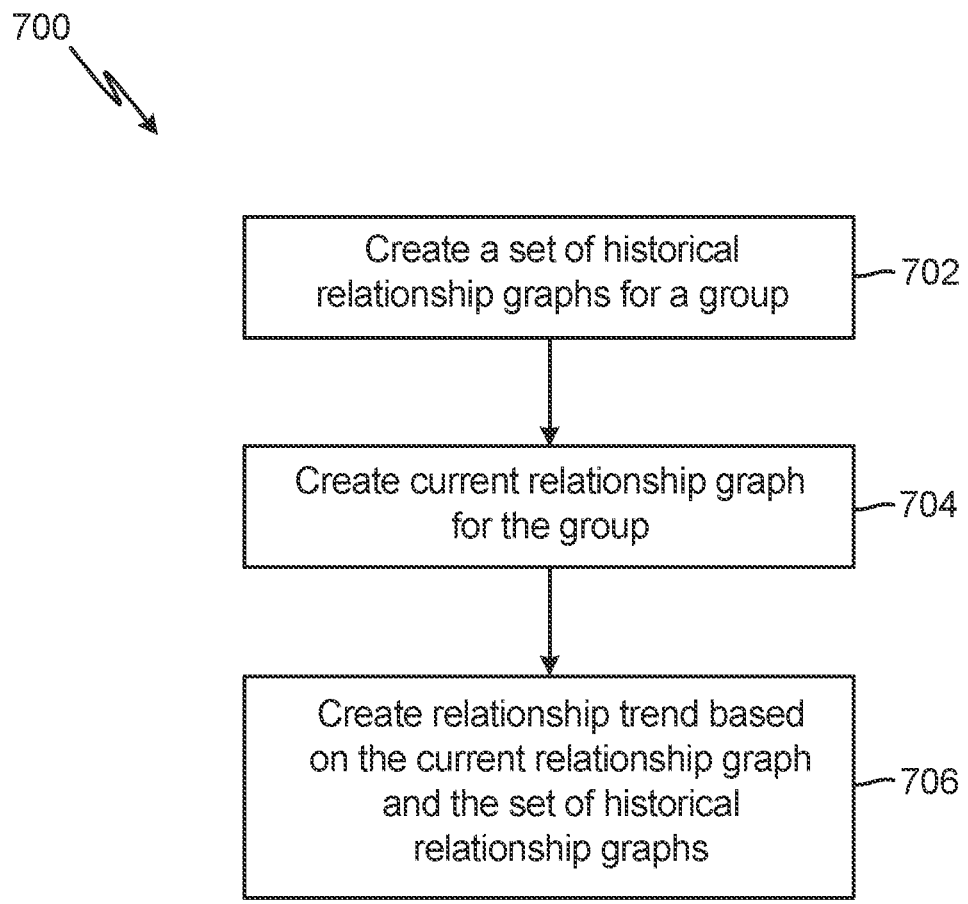
FIG. 8 is a flow diagram of an example of a method of generating a relationship score based on historical data

FIG. 8 is a flow diagram of method 700, which is a method of generating a relationship score based on historical data. Method 700 includes steps 702-706 of creating a set of historical relationship graphs for a group (step 702), creating a current relationship graph for the group (step 704), creating a relationship trend based on the current relationship graph and the set of historical relationship graphs (step 706). As will be explained in more detail subsequently, the relationship scores generated using method 700 are based in part on historical relationship graph information and, as such, are at least partially representative of relationship progress for a group of individuals. Relationship score information created using method 700 can be used to determine whether relationships among the group are improving or worsening in strength. Where relationships among the group are worsening, one or more individuals of the group can take corrective actions to improve relationship quality within the group.

In step 702, a set of historical relationship graphs is created for a group of individuals. The set of historical relationship graphs describes the relationships of the members of the group over a period of time. Each graph of the set can be created using steps 602-612 of method 600 (FIG. 6) and represents the relationships of the same individuals. Each graph represents an interacting event including the members of the group that occurred at a particular time point, such that the set of historical relationship graphs represents the relationships among the group members over a period of time defined by the earliest interacting event of the series and the most recent interacting event of the series. Each graph can be created, for example, at regular time intervals, such as after a predetermined number of hours, minutes, and/or seconds has elapsed. Additionally and/or alternatively, each graph can be created during a recurring event or meeting attended by all members of the group.

The graphs created in step 702 are created using video data of historical interacting events that occurred prior to the time at which the video data for the interacting event described by the graph produced in step 704 is collected. The graphs created in step 702 can be created substantially after video data of the historical interacting events is collected. For example, all video data of the historical events can be collected and stored to a memory device, such as memory 104, and relationship can be created according to steps 604-612 of method 600 (FIG. 6) for each interacting event subsequently. Additionally and/or alternatively, the graphs created in step 702 can be created simultaneously, substantially simultaneously, contemporaneously, or substantially contemporaneously as video data of each the historical event is collected.

In step 704, a current relationship graph for the group. The current relationship graph is created using video data of a more recent interacting event than the interacting events described by the set of historical relationship graphs created in step 702, and therefore describes relationships among the individuals of the group at a more recent point in time than the graphs of the set of historical relationship graphs created in step 702. The current relationship graph can be created in substantially the same way as the relationship graphs created in step 704.

In step 706, the current relationship graph created in step 704 and the plurality of time-resolved relationship graphs are used to create a relationship trend. The relationship trend created in step 706 is representative of the progress over time of relationships among the individuals of the group of individuals. The relationship trend can indicate, for example, that the relationships among individuals of the group are trending in a positive direction, such that those relationships have become stronger over time. The relationship trend can also indicate, for example, that the relationships among individuals of the group are trending in a negative direction, such that those relationships have become weaker over time.

The relationship trend created in step 706 can created by, for example, creating relationship scores using relationship scoring module 146 (FIG. 1) for the current relationship graph and the set of historical relationship graphs. The relationship scores created in this manner can be plotted and a trend can be determined from the plotted relationship scores. For example, a trendline can be fit to the plotted relationship scores.

The relationship trend can be output to a user interface, such as user interface 106, after step 706 and can be output in any suitable format. For example, if the trend is determined by fitting a trend line, the equation of the trend line can be output as the relationship trend. In other examples where the relationship trend is determined by fitting a trend line, only the slope of the trend line can be output as the relationship trend. In other examples, the sign of the trend line can be output as the relationship trend. In yet further examples, memory 104 can store one or more tables, arrays, and/or databases relating relationship trends to letter grades, and processor 102 to cross-reference the table(s), array(s), and/or database(s) with the relationship trend to determine the alphanumeric characters representative of the letter grade to be output via the user interface device.

While method 700 has been discussed herein as requiring video data capturing interacting events of the same individuals of a group over time, in some examples, method 700 can be performed such that the interacting events used to generated the historical relationship graphs in step 702 and/or the current graph created in step 704 includes fewer than all of the same individuals. For example, if some or all of the interacting events used to create the set of historical relationship graphs can include only substantially all of the individuals of the group (i.e., rather than every interacting event including all individuals of the group), having a sufficiently high percentage of the group represented in each relationship graph of the set of historical relationship graphs can allow those graphs to be used to determine trends that are sufficiently accurate descriptions of changes in the relationships of the group over time.

In some examples, method 700 can be performed repeatedly to determine changes in the trend over subsequent interacting events. In these examples, the current relationship graph created in step 704 can be stored to the set of historical relationship graphs. Step 702 can be omitted in subsequent iterations and steps 704 and 706 can be repeated to create a new relationship graph for a more recent interacting event and to update the trend to include the score for the new relationship graph.

Advantageously, the trends created by method 700 can enable one or more individuals of the group and/or an individual in a managerial position relative to the members of the group to more easily and accurately understand trends in the relationship among group members than by conventional methods, such as by manually and subjectively evaluating relationships among individuals of the group. One or more of the individuals and/or an individual in a managerial position can use the data created by method 700 to improve the group dynamic or, in some examples where the trend indicates that the relationships of the group are improving, provide confirmation that the relationships of the group are trending in a positive direction.

Figure 9:
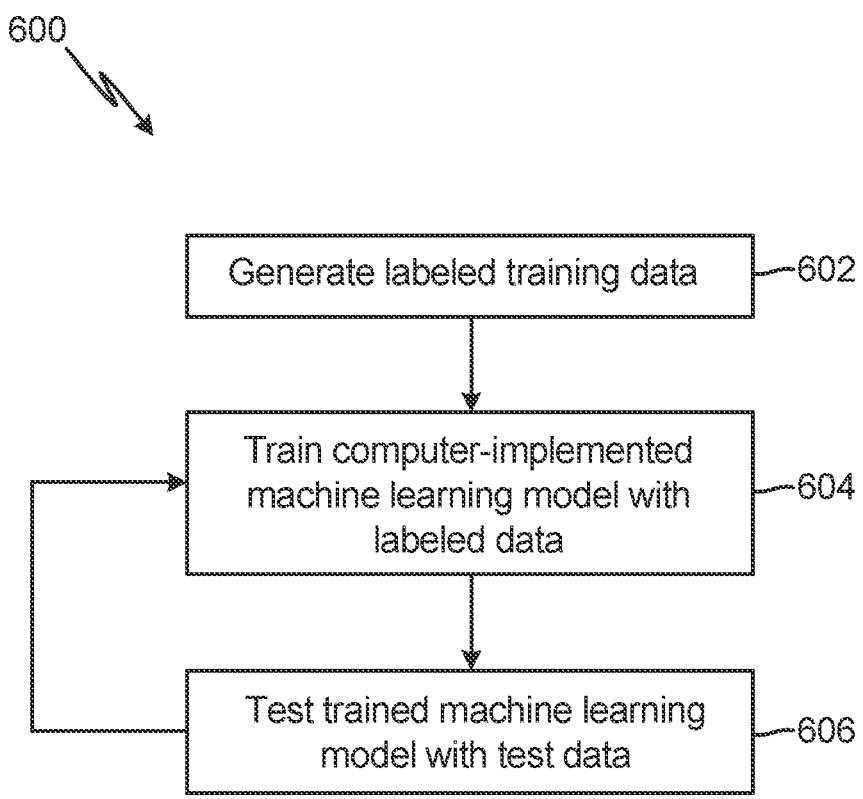
FIG. 9 is a flow diagram of an example of a method of training a computer-implemented machine learning model for use with other methods of this disclosure.

FIG. 9 is a flow diagram of method 750, which is a method of training a computer-implemented machine learning model for use with other methods of this disclosure. Method 750 includes steps 752-756 of generating labeled training data (step 752), training the computer-implemented machine learning model with the labeled data (step 754), and testing the trained computer-implemented machine learning model with test data (step 756). Method 750 can be used to train any machine learning model described herein (e.g., for a machine learning model for identifying and extracting features, for a machine learning model for creating relationship graphs, for a machine learning model for scoring relationship graphs, etc.) but will be discussed with respect to a generic machine learning model for explanatory purposes.

In step 752, labeled data is generated. The labeled data can be generated by tagging a data with one or more labels describing the data. For example, where the labeled data is a set of relationship graphs, each relationship graph can be tagged with a relationship score. The labeled data can be, for example, labeled video data. The labeled data can also be, for example, audio data, image data, semantic text data, or labeled outputs of another trained machine learning model. The labeled data can be one or more features used to create a relationship graph via, for example, method 600. The labeled data can also be, for example, one or more relationship graphs.

In step 754, the labeled data is used to train the computer-implemented machine learning model. As used herein, "training" a computer-implemented machine learning model refers to any process by which parameters, hyper parameters, weights, and/or any other value related model accuracy are adjusted to improve the fit of the computer-implemented machine learning model to the training data. The labeled data can be transformed by, for example, one or more programs and/or one or more other trained machine learning models before it is used for training in step 754.

In step 756, the trained computer-implemented machine learning model is tested with test data. The test data used in step 756 is unlabeled data that is used to qualify and/or quantify performance of the trained computer-implemented machine learning model. More specifically, a human or machine operator can evaluate the performance of the machine learning model by evaluating the fit of the model to the test data. Step 756 can be used to determine, for example, whether the machine learning model was overfit to the labeled data during model training in step 754.

As depicted in FIG. 9, steps 754 and 756 can be performed iteratively to improve the performance of the machine learning model. More specifically, if the fit of the model to the unlabeled data determined in step 756 is undesirable, step 754 can be repeated to further adjust the parameters, hyper parameters, weights, etc. of the model to improve the fit of the model to the test data. Step 756 can then be repeated with a new set of unlabeled test data to determine how the adjusted model fits the new set of unlabeled test data. If the fit continues to be undesirable, further iterations of steps 754 and 756 can be performed until the fit of the model becomes desirable.

Figure 10:
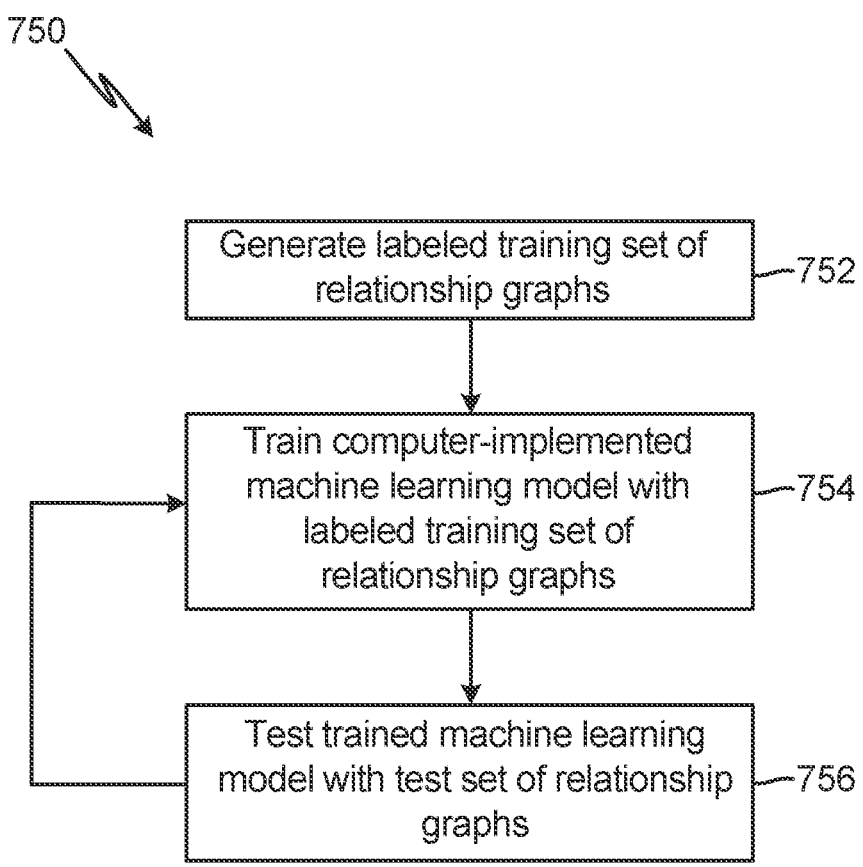
FIG. 10 is a flow diagram of an example of a method of training a computer-implemented machine learning model for scoring relationship graphs.

FIG. 10 is a flow diagram of method 760, which is a method of training a computer-implemented machine learning model for scoring relationship graphs. Method 760 is substantially the same as method 750, but is configured to train a computer-implemented machine learning model to score relationship graphs. Accordingly, method 760 includes steps 762-766 of generating a labeled training set of relationship graphs (step 762), training the computer-implemented machine learning model with the labeled training set of relationship graphs (step 764), and testing the trained computer-implemented machine learning model with a test set of relationship graphs (step 766). Steps 762, 764, and 766 are substantially the same as steps 752, 754, and 756, respectively, of method 750, but are performed using a labeled training set of relationship graphs rather than another type of labeled training data.

In step 762, the labeled training set of relationship graphs can be created by, for example, acquiring video data of a plurality of interacting events, creating relationship graphs for those interacting events, and labeling those relationship graphs with a relationship score. In some examples, individual edges of each relationship graph can be labeled with a value representing the edge's contribution to an overall relationship score. Where the individuals of the group for which a relationship score is to be generated using the trained machine learning model is known, the video data used to generate the labeled training set of relationship graphs can portray interacting events between only the individuals of the group. In other examples, the video data used to generate the labeled training set of relationship graphs can portray interacting events including any suitable individuals.

The labeled training set of relationship graphs can then be used in step 764 to train a machine learning model in substantially the same way as discussed previously with respect to step 754 of method 750. The trained machine learning model can then be tested in step 766 using a test set of unlabeled relationship graphs in substantially the same way as described previously with respect to step 756 of method 700.

Methods 750 and 760 advantageously allow for the training of machine learning models that can be used to create and score relationship graphs. In particular, method 750 advantageously allows for the training of machine learning models that can be used by relationship evaluator 100 to, for example, extract features from video data and/or create relationship graphs based on extracted features. Method 760 advantageously allows for the training of machine learning models that can be used to evaluate and/or score the relationships of individuals captured in video data.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the present disclosure.

The invention claimed is:

1. A method comprising:
acquiring digital video data that portrays an interacting event, the interacting event comprising a plurality of interactions between a first individual and a second individual;
extracting image data from the digital video data;
extracting audio data from the digital video data; and
extracting semantic text data from the digital video data;
identifying a plurality of video features in the digital video data by:
analyzing the image data with a first computer-implemented machine learning model;
analyzing the audio data with a second computer-implemented machine learning model; and
analyzing the semantic text data with a third computer-implemented machine learning model;

wherein:
  each video feature of the plurality of video features corresponds to an interaction of the plurality of interactions, and
  each video feature of the plurality of features is associated with at least one of the first individual and the second individual;
analyzing the plurality of video features to create a relationship graph, wherein:
  the relationship graph comprises a first node, a second node, and a first edge extending from the first node to the second node;
  the first node represents the first individual;
  the second node represents the second individual; and
  a weight of the first edge represents a relationship strength between the first individual and the second individual;
determining, by a fourth computer-implemented machine learning model, a relationship score based on the relationship graph; and
outputting, by a user interface, the relationship score.

2. The method of claim 1, wherein determining the relationship score comprises:
extracting a plurality of graph features from the relationship graph; and
generating, by the fourth computer-implemented machine learning model, the relationship score based on the plurality of graph features.

3. The method of claim 1, wherein identifying the plurality of features comprises analyzing at least one of the image data, the audio data, and the semantic text data with the second computer-implemented machine learning model to identify the plurality of features.

4. The method of claim 3, and further comprising training the fourth computer-implemented machine learning model using a labeled training set of relationship graphs before acquiring the video data that portrays the interacting event.

5. The method of claim 4, wherein each relationship graph of the labeled training set of relationship graphs represents an interacting event between two or more of the first individual, the second individual, a third individual not portrayed in the acquired video data, and a fourth individual not portrayed in the acquired video data.

6. The method of claim 4, wherein the plurality of interactions of the interacting event are between the first individual, the second individual, and a third individual.

7. The method of claim 6, wherein the relationship graph further comprises a third node, a second edge extending from the first node to the third node, and a third edge extending from the second node to the third node, wherein:
  the third node represents the third individual;
  a weight of the second edge represents a relationship strength between the first individual and the third individual; and
  a weight of the third edge represents a relationship strength between the second individual and the third individual.

8. The method of claim 7, wherein:
the plurality of interactions of the interacting event are between the first individual, the second individual, the third individual, and a fourth individual; and
the relationship graph further comprises a fourth node, a fourth edge extending from the first node to the fourth node, a fifth edge extending from the second node to the fourth node, and a sixth edge extending from the third node to the fourth node, wherein:
  the fourth node represents the fourth individual;
  a weight of the fourth edge represents a relationship strength between the first individual and the fourth individual;
  a weight of the fifth edge represents a relationship strength between the second individual and the fourth individual;
  a weight of the sixth edge represents a relationship strength between the third individual and the fourth individual.

9. The method of claim 8, wherein determining the relationship score based on the relationship graph comprises determining the relationship score based on the weight of the first edge, the weight of the second edge, the weight of the third edge, the weight of the fourth edge, the weight of the fifth edge, and the weight of the sixth edge.

10. The method of claim 9, wherein each relationship graphs of the labeled training set of relationship graphs is labeled as a positive interacting event or a negative interacting event, such that the labeled training set of relationship graphs comprises a plurality of positive-labeled relationship graphs and a plurality of negative-labeled relationship graphs.

11. The method of claim 10, wherein the fourth computer-implemented machine learning model is trained to output a percentage value representative of a similarity between the interacting event and the plurality of positive-labeled relationship graphs.

12. The method of claim 11, wherein the relationship graph and the labeled training set of relationship graphs are directed graphs.

13. The method of claim 12, and further comprising:
comparing the relationship graph to a previous relationship graph representative of a previous interacting event, the previous interacting event comprising a previous plurality of interactions between the first individual, the second individual, and the third individual; and
generating a relationship trend based on the comparison.

14. A system comprising:
a camera device for acquiring digital video data;
a processor;
a user interface; and
a memory encoded with instructions that, when executed, cause the processor to:
  acquire digital video data from the camera, wherein the digital video data portrays an interacting event comprising a plurality of interactions between a first individual and a second individual;
  extract image data from the digital video data;
  extract audio data from the digital video data;
  extract semantic text data from the digital video data;
  identify a plurality of features in the digital video data by:
    analyzing the image data with a first computer-implemented machine learning model;
    analyzing the audio data with a second computer-implemented machine learning model; and
    analyzing the semantic text data with a third computer-implemented machine learning model;
  analyze the plurality of features to create a relationship graph, wherein:
    the relationship graph comprises a first node, a second node, and a first edge extending from the first node to the second node;
    the first node represents the first individual;

the second node represents the second individual; and a weight of the first edge represents a relationship strength between the first individual and the second individual;

determine, by a fourth computer-implemented machine learning model, a relationship score based on the relationship graph; and output, by the user interface, the relationship score.

15. The system of claim 14, wherein:

the plurality of interactions of the interacting event are between the first individual, the second individual, and a third individual;

the relationship graph further comprises a third node, a second edge extending from the first node to the third node, and a third edge extending from the second node to the third node;

the third node represents the third individual;

a weight of the second edge represents a relationship strength between the first individual and the third individual; and a weight of the third edge represents a relationship strength between the second individual and the third individual.

* * * * *